United States Patent [19]

Sakaguchi et al.

[11] 3,985,665

[45] Oct. 12, 1976

[54] TONER COMPOSITION FOR USE IN ELECTROPHOTOGRAPHY COMPRISING NOVEL POLYESTER BINDER RESIN

[75] Inventors: Kahei Sakaguchi; Masaaki Minakata; Hirotaka Takemoto, all of Wakayama; Shigeru Takamori, Osaka, all of Japan

[73] Assignee: Kao Soap Co., Ltd., Tokyo, Japan

[22] Filed: Dec. 27, 1974

[21] Appl. No.: 536,905

[30] Foreign Application Priority Data
Dec. 29, 1973 Japan.................................. 48-3686

[52] U.S. Cl. ...................... 252/62.1 R; 252/62.1 L; 252/62.1 P; 260/40 R; 260/75 R; 260/75 S; 427/14; 427/19

[51] Int. Cl.² ...................... G03G 9/08; G03G 9/10; G03G 9/12

[58] Field of Search .................... 260/75 R, 75 S; 252/62.1; 427/14, 19

[56] References Cited
UNITED STATES PATENTS

| | | | |
|---|---|---|---|
| 3,467,719 | 9/1969 | Thompson | 260/75 N |
| 3,525,714 | 8/1970 | Zeschman | 260/75 N |
| 3,544,656 | 12/1970 | Hornung | 260/75 R |
| 3,557,691 | 1/1971 | Bayer | 252/62.1 |
| 3,590,000 | 6/1971 | Palermitti et al. | 252/62.1 |
| 3,681,106 | 8/1972 | Burns et al. | 252/62.1 |
| 3,819,367 | 6/1974 | Chatterji et al. | 252/62.1 |

*Primary Examiner*—Mayer Weinblatt
*Assistant Examiner*—John D. Smith
*Attorney, Agent, or Firm*—Woodhams, Blanchard and Flynn

[57] ABSTRACT

A toner composition for use in electrophotography comprising 1 to 20 parts by weight of a colorant and 80 to 99 parts by weight of a resin, wherein said resin consists essentially of a. from 55 to 100 percent by weight of a polyester resin having a softening point of 100° to 145°C. measured in accordance with ASTM-E28-51T (ring and ball method) which is obtained by the reaction of:
1. a dicarboxylic acid component containing 50 mol percent or more of a dicarboxylic acid, or an anhydride thereof, selected from the group consisting of fumaric acid, maleic acid, succinic acid, maleic anhydride and succinic anhydride; with
2. a polyol component containing more than 50 mol percent of a glycol having the formula

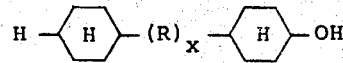

wherein X is o or 1, and R is alkylene having 1 to 5 carbon atoms, sulfur, oxygen,

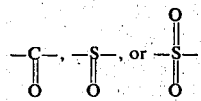

and

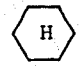

is cyclohexyl and,
b. the balance of said resin, i.e., from 0 to 45 percent by weight of said resin, is a resin having a softening point of 80°C to 150°C selected from the group consisting of polystyrene, rosin maleate, petroleum resin, and epoxy resin.

11 Claims, No Drawings

TONER COMPOSITION FOR USE IN ELECTROPHOTOGRAPHY COMPRISING NOVEL POLYESTER BINDER RESIN

BACKGROUND OF THE INVENTION

1. FIELD OF THE INVENTION

This invention relates to a toner composition for use in electrophotography. More specifically, this invention relates to a toner composition for use in electrophotography that can be uniformly, strongly and negatively charged in either the direct or indirect electrophotographic developing method, thereby developing or rendering visible a positively charged electrostatic latent image on a copying substrate, to give a visible image free of fogging.

As is well known, xerography is an electrophotographic method utilizing static electricity. There have been practiced several methods for developing the electrostatic latent image which is formed on the surface of an insulating substance. Commercially and widely employed methods includes the cascade method in which glass beads are used as a carrier for the toner and the magnetic brushing method in which iron powder is used as a carrier. In both of these methods the toner particles are electrified by friction and adhered onto the electrostatic latent image by means of electrostatic attraction.

A toner is a colored resin powder which, when charged by friction, either by the cascade method or the magnetic brushing method, should be charged uniformly either entirely positive or entirely negative, in order to make it possible to obtain a developed visible image free of fogging.

When the non-exposed portion of the surface of the photosensitive layer forms a positive electrostatic latent image after having been charged and exposed, a positive developed image will not be obtained during development unless developing is effected using a negatively charged toner. It is known that when a toner composed of a known polystyrene or polyester resin and which contains non charge-control agent is charged by friction by the cascade method or the magnetic brushing method, it is electrified with only a weak positive or a weak negative charge. It is difficult to electrify such toners with a negative charge that is strong enough to produce a developed image having a high image density and clarity. When it is desired to electrify such a toner with a strong negative charge, it is known to add an azo type oil-soluble dye containing a complex compound of chromium, as a charge control agent, as reported in Japanese Pat. Publication No. 26478/70. But a major disadvantage in controlling the electrification of the toner by friction by adding a charge-control agent is that the charge-control agent usually is difficult to blend uniformly in the thermoplastic resin, so that a non-uniform dispersion is formed which makes it difficult to obtain a uniform negative charge on the surface of the toner grains, thus resulting in fogging or trailing during developing and eventually making it hard to obtain a clear developed image.

To overcome such disadvantages, there should be used a thermoplastic resin that by its inherent nature is substantially and strongly electrified negative, by friction, without the aid of a charge-control agent. According to the Study of Friction Electrification of Resins (for example, "Electrophotography" by Isao Shinohara, Vol. 10 No. 1, pp. 2–13, 1971), it is known that Saran, Teflon and polyvinyl chloride have a greater tendency to be electrified negative, in comparison to polystyrenes. These halogenated thermoplastic resins have a potential of use as a toner resin from the viewpoint of their electrification properties, but they lack other physical properties required for toner resins. Such halogenated thermoplastic resins fail to meet the following requirements for toner resins:

1. melt sharply at relatively low temperatures;
2. do not develop blocking or caking at ordinary (20° to 25° C) temperature;
3. easy to pulverize;
4. good stability; and
5. good blending with a colorant.

Owing to the foregoing reasons, halogenated thermoplastic resins are not used in practice. Furthermore, these halogenated thermoplastic resins, at the time of heat fixing of the toner, undergo thermal decomposition evolving halogen vapor and causing discoloration of the colorant as well as corrosion of the metallic parts of the machinery.

SUMMARY OF THE INVENTION

We have discovered a special polyester resin having a particular chemical structure. It can be substantially uniformly and strongly electrified negative, by friction. Based on this discovery, according to this invention, there is provided a toner composition for electrophotographic development purposes that can substantially uniformly and strongly charged negative by the cascade method or by the magnetic brushing method. The toner composition according to the invention satisfies the aforementioned requirements (1)–(5) for practical toner compositions. The toner composition, according to the invention, does not evolve harmful gases such as halogen vapors at the time of heat fixing of the toner.

The invention provides a toner composition for use in electrophotographic development comprising 1 to 20 parts by weight of a colorant and 80 to 99 parts by weight of a resin composition, wherein the resin composition consists essentially of a. 55 to 100 percent by weight of a polyester resin (first resin component) having a softening point of 100° C to 145° C measured in accordance with ASTM-E 28-51T (ring and ball method), which polyester resin is obtained by the reaction of
1. a dicarboxylic acid component containing 50 mole percent or more of a dicarboxylic acid, or an anhydride thereof, selected from fumaric acid, maleic acid, succinic acid, maleic anhydride and succinic anhydride, with
2. a polyol component containing more than 50 mole percent of a glycol having the formula

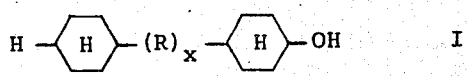   I wherein x is 0 or 1, and R is alkylene having 1 to 5 carbon atoms, S, O,

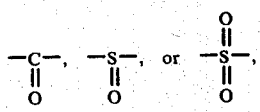

and

is cyclohexyl and, b. the balance of said resin composition, i.e. from 0 to 45 percent by weight of said resin composition is a resin (optional second resin component) having a softening point of 80° C to 150° C selected from the group consisting of polystyrene, rosin maleate, petroleum resin, and epoxy resin.

It is critical that the dicarboxylic acid component (1) used for the preparation of polyester resin (a) of this invention consists of 50 to 100 mol percent of fumaric acid, maleic acid, succinic acid, or an anhydride thereof. The balance of the dicarboxylic acid component, i.e., zero to 50 mol percent thereof, consists of one or more other unsaturated or saturated, aliphatic or aromatic, hydrocarbon dicarboxylic acids such as itaconic acid, phthalic acid, isophthalic acid, terephthalic acid, cyclohexane dicarboxylic acid, adipic acid, sebacic acid, malonic acid, oxalic acid and the like.

Referring to the polyol component (2), it is critical that this consists of from 50 to 100 mole percent of a glycol of formula (I). Typical examples of the glycol of formula (I) are 2,2-bis(4-cyclohexanol)propane, 2,2-bis(4-cyclohexanol)thioether, 2,2-bis(4-cyclohexanol)ether, 2,2-bis(4-cyclohexanol)ketone, and 2,2-bis(4-cyclohexanol)sulfone.

The balance of the polyol component (2), i.e., from zero to 50 mol percent thereof, consists of one or more polyester-forming polyols, such as ethylene glycol, diethylene glycol, triethylene glycol, 1,2-propanediol, 1,4-butanediol, neopentylglycol, 1,4-bis(hydroxymethyl)cyclohexane, polyoxyalkylene bisphenol A, glycerin, and pentaerythritol.

The polyesterification reaction is carried out employing a ratio, by equivalent, of polyol component to dicarboxylic acid component of 0.8 to 1.2/1.0, preferably at 1/1, at a reaction temperature of 160° C. to 210° C, in a stream of an inert gas (e.g., nitrogen gas), and carrying out the reaction until the acid value of the resulting polyester becomes less than 50, so as to yield a polyester having a softening point of 100° C. to 145° C.

The toner composition according to this invention comprises the aforementioned polyester resin and a colorant, but if desired, it can further optionally contain conventional binder resins for toners such as polystyrene, rosin maleate, petroleum resin, or epoxy resin having a softening point of 80° C to 150° C.

Further, the toner composition can further optionally contain a small amount of charge-control agent, plasticizer, and filler.

It is required that the polyester resin (a) is from 55 to 100 percent by weight, based on the total weight of the resins used in the toner composition. The balance of the total resins, i.e. from 0 to 45 percent by weight thereof, is one or more of the conventional toner binder resins.

The colorant can be a pigment or a dye. A single colorant or a mixture of two or more colorants can be used. The colorant employed is not critical and any conventional colorant for toners for electrophotography can be employed. Examples of suitable pigments are carbon black, prussian blue, rouge, cadmium yellow and the like. Examples of suitable dyes are Naphtol B, Eriochrome B, phthalocyanine blue, Lithol Rubine and the like.

The colorant is used in the range of from 1 to 20 percent by weight, preferably 3 to 10 percent by weight, based on the total weight of the toner composition.

The toner composition of the present invention can be prepared either by the liquid spray method or the pulverization method, both of which are conventional methods. In the case of the liquid spray method, the toner composition is prepared by dissolving a mixture of polyester resin and colorant in a solvent such as carbon tetrachloride, spraying the resulting liquid, atomizing it into finely divided particles, drying it, and recovering it by electric precipitator. In the case of the pulverization method, a mixture of the resin and colorant that has been uniformly dissolved and mixed is pulverized by a jet pulverizer to afford powders having a particle size of 5 to 20 microns.

The toner composition can be blended with glass beads or iron powder to form dry developers. The amount of glass beads or iron powder can be in the range conventionally employed, e.g. from 10 to 100 parts of glass beads or iron powder, per one part of toner composition.

The toner according to this invention can be used only for the dry developing method, i.e. as dry powder, but also for the liquid developer of electrophotography in which developing is effected by dispersing the toner in an insulating carrier liquid. In this case, the positive electrostatic latent image can be made visible to obtain a positive image by causing negative electrification of the toner in the carrier liquid.

The carrier liquid is conventional, normally a liquid hydrocarbon having a resistivity of more than $10^9$ Ω.cm and a dielectric constant of less than 3. The amount of the carrier liquid is in the range conventionally employed, e.g., from 10 to 100 parts of carrier liquid, per one part by weight of toner composition.

The invention is further described below in more detail by reference to the following illustrative Preparations, Examples and Comparative Examples.

PREPARATION 1

A polyester resin having an acid value of 35 and softening point of 120° C (measured according to ASTM-E 28-51T (ring and ball method), this measuring method also applies to succeeding Examples) was prepared by feeding 480.8 g (2.0 mole) of 2,2-bis(4-cyclohexanol) propane, 98.1 g (1.0 mole) of maleic anhydride, 148.1 g (1.0 mole) of phthalic anhydride and 0.29 g (0.04 percent by weight with respect to the total of the other ingredients) of hydroquinone into a 1-liter four-necked flask equipped with a stirrer, a nitrogen gas inlet tube, thermometer, and a tube for removing water, and the reaction is conducted at 170° C to 200° C under a nitrogen gas stream and while distilling off the produced water out of the reaction system, to yield a polyester resin.

PREPARATION 2

A polyester resin having an acid value of 32 and a softening point of 110° C was prepared by feeding 480.8 g (2.0 mole) of 2,2-bis(4-cyclohexanol)propane, 116.1 g (1.0 mole) of fumaric acid, 146.1 g (1.0 mole) of adipic acid and 0.30 g (0.04 percent by weight with respect to the total feed amount) of hydroquinone into the same reaction vessel as used in Preparation 1, and conducting the reaction at 170° C to 200° C in a nitrogen gas stream while distilling off the water that formed.

PREPARATION 3

A polyester resin having an acid value 33 and a softening point of 115° C was prepared by feeding 240.4 g (1.0 mole) of 2,2-bis(4-cyclohexanol)propane, 354.0 g (1.0 mole) of polyoxypropylene (2,2)-2,2-bis(4-hydroxyphenyl)propane, 232.2 g (2.0 mole) of fumaric acid and 0.33 g (0.04 percent by weight with respect to the total feed amount) of hydroquinone into the same reaction vessel as used in Preparation 1, and conducting the reaction at 170° C to 200° C in a nitrogen gas stream while distilling off the water that formed.

PREPARATION 4

A polyester resin having an acid value 30 and a softening point of 110° C was prepared by feeding 360.5 g (1.5 mole) of 2,2-bis(4-cyclohexanol)propane, 156.3 g (1.5 mole) of neopentyl glycol, 348.3 g (3.0 mole) of fumaric acid and 0.35 g (0.04 percent by weight with respect to the total feed amount) of hydroquinone into the same reaction vessel as used in Preparation 1, and conducting the reaction at 170° C to 200° C in a nitrogen gas stream while distilling off the water that formed.

PREPARATION 5

A polyester resin having an acid value of 28 and a softening point of 105° C was prepared by feeding 360.5 g (1.5 mole) of 2,2-bis(4-cyclohexanol)propane, 114.2 g (1.5 mole) of propylene glycol, 348.3 g (3.0 mole) of fumaric acid and 0.33 g (0.04 percent by weight with respect to the total feed amount) of hydroquinone into the same reaction vessel as used in the Preparation 1, and conducting the reaction at 170° C to 200° C in a nitrogen gas stream while distilling off the water that formed.

PREPARATION 6

A polyester resin having an acid value of 30 and a softening point of 110° C was prepared by feeding 360.5 g (1.5 mole) of 2,2-bis(4-cyclohexanol) propane, 93.2 g (1.5 mole) of ethylene glycol, 348.3 g (3.0 mole) of fumaric acid and 0.32 g (0.04 percent by weight with respect to the total feed amount) of hydroquinone into the same reaction vessel as used in Preparation 1 and conducting the reaction at 170° C to 200° C in a nitrogen gas stream while distilling off the water that formed.

PREPARATION 7

A polyester resin having an acid value of 28 and a softening point of 120° C was prepared by feeding 240.4 g (1.0 mole) of 2,2-bis(4-cyclohexanol)propane, 318.6 g (0.9 mole) of polyoxypropylene (2,2)-2,2-bis(4-hydroxyphenyl) propane, 9.2 g (0.1 mole) of glycerin, 232.2 g (2.0 mole) of fumaric acid and 0.32 (0.04 percent by weight based on the total feed amount) of hydroquinone into the same reaction vessel as used in Preparation 1 and conducting the reaction at 170° C to 200° C in a nitrogen gas stream while distilling off the water that was formed.

PREPARATION 8

A polyester resin having an acid value of 31 and a softening point of 120° C was prepared by feeding 240.4 g (1.0 mole) of 2,2-bis(4-cyclohexano)propane, 354.0 (1.0 mole) of polyoxyethylene (2,2)-2,2-bis(4-hydroxyphenyl) propane, 116.1 g (1.0 mole) of fumaric acid, 166.1 g (1.0 mole) of isophthalic acid and 0.35 g (0.04 percent by weight with respect to the total feed amount) of hydroquinone into the same reaction vessel as used in Preparation 1 and conducting the reaction at 170° C to 200° C in a nitrogen gas stream while distilling off the water that was formed.

PREPARATION 9

A polyester resin having an acid value of 30 and a softening point of 115° 35 C was prepared by feeding 240.4 g (1.0 mole) of 2,2-bis(4cyclohexanol)propane, 354.0 g (1.0 mole) of polyoxypropylene (2,2)-2,2-bis(4-hydroxyphenyl)propane, 116.1 g (1.0 mole) of fumaric acid, 118.1 g (1.0 mole) of succinic acid and 0.33 g (0.04 percent by weight with respect to the total feed amount) of hydroquinone into the same reaction vessel as used in Preparation 1 and conducting the reaction at 170° C to 200° C in a nitrogen gas stream while distilling off the water that was formed.

PREPARATION 10

A polyester resin having an acid value of 35 and a softening point of 140° C was prepared by feeding 384.6 g (1.6 moles) of 2,2-bis(4-cyclohexanol)propane, 141.6 g (0.4 mole) of polyoxypropylene (2,2)-2,2-bis(4-hydroxyphenyl)propane, 232.2 g (2.0 moles) of fumaric acid and 0.30 g (0.04 percent by weight with respect to the total feed amount) of hydroquinone into the same reaction vessel as used in Preparation 1 and conducting the reaction at 170° C to 200° C in a nitrogen gas stream while distilling off the water that was formed.

COMPARATIVE EXAMPLE 1

A toner having a particle size of 5 to 20 microns was prepared by melting and blending on a heated roll 90 parts by weight of polystyrene (e.g., Picolastic D125 of Esso Standard Co., softening point 125° C) and 10 parts by weight of carbon black, cooling and crushing the mixture and further finely pulverizing the resulting mixture by a jet pulverizer. A control dry developer for the purpose of comparison was prepared by mixing 2 parts by weight of the thus-prepared toner and 100 parts by weight of glass beads or iron powder.

The positive electrostatic latent image formed on a photosensitive layer was developed and made visible and transferred to an ordinary paper to obtain image according to two developing methods, i.e., a cascade method in which glass beads are used as a carrier as described in U.S. Pat. No. 2 618 551 and the canon NP method (magnetic brushing method in which iron powder is used as a carrier as described in Japanese Patent Publications 23910/67 and 24748/68. The results are shown in Table 1.

COMPARATIVE EXAMPLE 2

A toner was prepared in the same manner as in Comparative Example 1 but using rosin maleate (softening point 110° C) in place of the polystyrene. The results are shown in Table 1.

COMPARATIVE EXAMPLE 3

A toner was prepared in the same manner as in Comparative Example 1 but using a petroleum resin (softening point 90° C) in place of using the polystyrene. The results are shown in Table 1.

COMPARATIVE EXAMPLE 4

A toner was prepared in the same manner as in Comparative Example 1 but using an epoxy resin (Epoxy resin DER 667 of Dow Chemical Co., softening point 127° C) in place of using the polystyrene. The results are shown in Table 1.

EXAMPLES 1-11

Toners having the compositions shown in Table 1 were prepared in the same manner as in Comparative Example 1 using the polyester resins obtained by the aforementioned Preparations 1-10. Images were developed by the cascade method and by the magnetic brushing method, to compare their performance with those of Comparative Examples 1-4. The results are shown in Table 1.

The images obtained using the toners of this invention were free of fogging in the step of developing the positive electrostatic latent image and were also free of trailing, by both the cascade method and by the magnetic brushing method.

gen gas stream while distilling off the water that was formed.

PREPARATION 12

A polyester resin having an acid value of 30 and a softening point of 120° C was prepared by feeding 230.3 g (1.0 mole) of bis(4-cyclohexanol)thioether, 354.0 g (1.0 mole) of bis(4-cyclohexanol)thioether, 354.0 g (1.0 mole) of polyoxypropylene (2,2)-2,2-bis(4-hydroxyphenyl)propane, 232.2 g (2.0 mole) of fumaric acid and 0.33 g (0.04 percent by weight with respect to the total feed amount) of hydroquinone into the same reaction vessel as used in Preparation 1, and conducting the reaction at 170° C to 200° C in a nitrogen gas stream while distilling off the water that was formed.

PREPARATION 13

A polyester resin having an acid value of 30 and a softening point of 120° C 2 was prepared by feeding 226.2 g (1.0 mole) of bis(4-cyclohexanol)ketone, 354.0 g (1.0 mole) of polyoxypropylene (2,2)-2,2-bis(4-hydroxyphenyl)propane, 232.2 g (2.0 moles) of fumaric acid and 0.33 g (0.04 percent by weight with Table 1

| | Resin (parts by weight) | | Carbon-black (parts by weight) | Toner charge *1) | Image property | Life (times) *2) | Evaluation (points) |
|---|---|---|---|---|---|---|---|
| Comparison Example 1 | Polystyrene | | 90 | 10 | charged to weak negative | fogged a little | 5,000 | 50 |
| Comparison Example 2 | Rosin maleate | | 90 | 10 | charged to weak negative | fogged | 2,500 | 40 |
| Comparison Example 3 | Petroleum resin | | 90 | 10 | charged to weak negative | fogged | 2,500 | 40 |
| Comparison Example 4 | Epoxy resin | | 90 | 10 | charged to weak negative | fogged | 3,000 | 45 |
| Example 1 | Resin of Preparation 1 | | 90 | 10 | charged to negative | no fog | 20,000 | 100 |
| Example 2 | Resin of Preparation 2 | | 90 | 10 | charged to negative | no fog | 15,000 | 90 |
| Example 3 | Resin of Preparation 3 | | 90 | 10 | charged to negative | no fog | 20,000 | 100 |
| Example 4 | Resin of Preparation 4 | | 90 | 10 | charged to negative | no fog | 18,000 | 95 |
| Example 5 | Resin of Preparation 5 | | 90 | 10 | charged to negative | no fog | 15,000 | 90 |
| Example 6 | Resin of Preparation 6 | | 90 | 10 | charged to negative | no fog | 15,000 | 90 |
| Example 7 | Resin of Preparation 7 | | 90 | 10 | charged to negative | no fog | 20,000 | 100 |
| Example 8 | Resin of Preparation 8 | | 90 | 10 | charged to negative | no fog | 15,000 | 90 |
| Example 9 | Resin of Preparation 9 | | 90 | 10 | charged to negative | no fog | 18,000 | 95 |
| Example 10 | Resin of Preparation 10 | | 90 | 10 | charged to negative | no fog | 20,000 | 100 |
| Example 11 | Resin of Preparation 3 | 50 | | | | | | |
| | | | 10 | charged to negative | no fog | 10,000 | 70 |
| | Polystyrene | 40 | | | | | | |

Note
*1): Electrification of the toner was confirmed by the appearance of a positive image by developing a positive electrostatic latent image by the cascade method and by the canon NP method of Comparative Example 1. *2): Life was determined by repeating the making of copies until no clear image could be obtained using the same toner.

PREPARATION 11

A polyester resin having an acid value of 30 and a softening point of 120° C was prepared by feeding 214.2 g (1.0 mole) of bis(4-cyclohexanol) ether, 354.0 g (1.0 mole) of polyoxypropylene (2,2)-2,2-bis(4-hydroxyphenyl)propane, 232.2 g (2.0 moles) of fumaric acid and 0.32 g (0.04 percent by weight with respect to the total feed amount) of hydroquinone into the same reaction vessel as used in Preparation 1, and conducting the reaction at 170° C to 200° C in a nitrorespect to the total feed amount) of hydroquinone into the same reaction vessel as used in Preparation 1, and conducting the reaction at 170° C to 200° C in a nitrogen gas stream while distilling off the water that was formed.

PREPARATION 14

A polyester resin having an acid value of 32 and a softening point of 122° C was prepared by feeding 262.3 g (1.0 mole) of bis(4-cyclohexanol)sulfone, 354.0 g (1.0 mole) of polyoxypropylene (2,2)-2,2- bis(4-hydroxyphenyl) propane, 232.2 g (2.0 moles) of fumaric acid and 0.34 g (0.04 percent by weight with respect to the total feed amount) of hydroquinone into the same reaction vessel as used in Preparation 1, and conducting the reaction at 170° C to 200° C in a nitrogen gas stream while distilling off the water that was formed.

PREPARATION 15

A polyester resin having an acid value of 30 and a softening point of 120° C was prepared by feeding 264.3 g (1.0 mole) of bis(4-cyclohexanol)sulfoxide, 354.0 g (1.0 mole) of polyoxypropylene (2,2)-2,2-bis(4-hydroxyphenyl)propane, 232.2 g (2.0 moles) of fumaric acid and 0.33 g (0.04 percent by weight with respect to the total feed amount) of hydroquinone into the same reaction vessel as used in Preparation 1, and conducting the reaction at 170° C to 200° C in a nitrogen gas stream while distilling off the water that was formed.

PREPARATION 16

A polyester resin having an acid value of 35 and a softening point of 140° 90 C was prepared by feeding 480.8 g (2.0 moles) of 2,2-bis(4-cyclohexanol)propane, 236.2 g (2.0 moles) of succinic acid, and 0.29 g (0.04 percent by weight with respect to the total feed amount) of hydroquinone into the same reaction vessel as used in Preparation 1, and conducting the reaction at 170° C to 200° C in a nitrogen gas stream while distilling off the water that was formed.

EXAMPLES 12-17

Toners of the compositions shown in Table 2 were prepared using the polyester resins obtained by the aforementioned Preparations 11-16 in accordance with the same method as Comparative Example 1, and images were developed by the cascade method and by the magnetic brushing method to determine their performance. The results are shown in Table 2.

According to the Examples of the present invention, images free of fogging or trailing can be obtained in developing positive electrostatic latent images by both the cascade method and by the magnetic brushing method.

parts by weight of a colorant and 80 to 99 parts by weight of binder resin, said binder resin consists essentially of
a. from 55 to 100 percent by weight of a polyester resin having a softening point of 100° to 145° C, said polyester resin being obtained by reacting
 1. a dicarboxylic acid component consisting essentially of from 50 to 100 mol percent of a substance selected from the group consisting of fumaric acid, maleic acid, succinic acid and anhydrides thereof, the balance of said dicarboxylic acid component being one or more polyester-forming dicarboxylic acids, or anhydrides thereof, with
 2. a polyol component consisting essentially of from 10 to 100 mol percent of a glycol having the formula

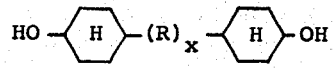

wherein $x$ is zero or 1, R is unsubstituted alkylene having one to 5 carbon atoms, sulfur, oxygen,

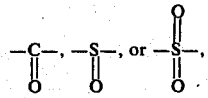

and

is cyclohexyl, and the balance of said polyol component is one or more polyester-forming polyols, and
b. the balance of said binder resin is a binder resin having a softening point of 80° to 150° C selected from the group consisting of polystyrene, rosin maleate, petroleum resin and epoxy resin.
2. A toner composition as claimed in claim 1, in which said polyester-forming dicarboxylic acids are selected from the group consisting of itaconic acid, phthalic acid, isophthalic acid, terephthalic acid, cyclohexanedicarboxylic acid, adipic acid, sebacic acid, malonic acid and oxalic acid.

Table 2

| | Resin (parts by weight) | | Carbon black (parts by weight) | Toner charge *) | Image property | Life *) (times) | Evaluation (points) |
|---|---|---|---|---|---|---|---|
| Example 12 | Resin of Preparation 11 | 90 | 10 | charged to negative | no fog | 15,000 | 90 |
| Example 13 | Resin of Preparation 12 | 90 | 10 | charged to negative | no fog | 15,000 | 90 |
| Example 14 | Resin of Preparation 13 | 90 | 10 | charged to negative | no fog | 15,000 | 90 |
| Example 15 | Resin of Preparation 14 | 90 | 10 | charged to negative | no fog | 15,000 | 90 |
| Example 16 | Resin of Preparation 15 | 90 | 10 | charged to negative | no fog | 15,000 | 90 |
| Example 17 | Resin of Preparation 16 | 90 | 10 | charged to negative | no fog | 20,000 | 100 |

*) Toner charge and life correspond to those of Table 1.

The embodiments of the invention in which an exclusive property or privilege is claimed are defined as follows:

1. A toner composition capable of being charged with a negative electric charge and adapted for use in electrophotographic development, consisting essentially of finely divided particles containing from 1 to 20

3. A toner composition as claimed in claim 1 in which said polyester-forming polyol is selected from the group consisting of ethyleneglycol, diethyleneglycol, triethyleneglycol, 1,2-propanediol, 1,4-butanediol, neopentylglycol, 1,4-bis(hydroxymethyl) cyclohexane, polyoxyalkylene bisphenol A, glycerine and pentaerythritol.

4. A process for developing electrostatic latent images which comprises imparting a negative charge to a toner composition as claimed in claim 1 and then applying the toner composition to a copy substrate bearing a positive electrostatic latent image in order to render said latent image visible.

5. A toner composition as claimed in claim 1, in the form of particles having a size of from 5 to 20 microns, admixed with a substance selected from the group consisting of iron powder and glass beads, the amount of said substance being sufficient to impart a strong and uniform positive electric charge to said toner particles.

6. A toner composition as claimed in claim 1, in the form of particles having a size of 5 to 20 microns, blended in an insulating organic carrier liquid to form an electrophotographic developer liquid.

7. A toner composition as claimed in claim 5, containing from 10 to 100 parts by weight of said substance, per one part by weight of said toner composition.

8. A toner composition as claimed in claim 1, which is charged with a negative electric charge.

9. A toner composition as claimed in claim 1, containing from 3 to 10 parts by weight of said colorant, and said colorant is a pigment or dye or mixture thereof, for developing electrostatic latent images.

10. A toner composition as claimed in claim 7, which is charged with a negative electric charge.

11. A toner composition as claimed in claim 1, in which R is propylene.

* * * * *